United States Patent
Kinoshita et al.

(10) Patent No.: US 9,335,454 B2
(45) Date of Patent: May 10, 2016

(54) COLOR FILTER AND DISPLAY APPARATUS INCLUDING THE SAME

(71) Applicant: TOPPAN PRINTING CO., LTD., Tokyo (JP)

(72) Inventors: Kayo Kinoshita, Tokyo (JP); Yasuhiro Kobashi, Tokyo (JP); Kodai Konno, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 13 days.

(21) Appl. No.: 14/227,552

(22) Filed: Mar. 27, 2014

(65) Prior Publication Data

US 2014/0240816 A1    Aug. 28, 2014

Related U.S. Application Data

(63) Continuation of application No. PCT/JP2012/074430, filed on Sep. 24, 2012.

(30) Foreign Application Priority Data

Sep. 30, 2011  (JP) .................. 2011-216675

(51) Int. Cl.

| | | |
|---|---|---|
| G02B 26/00 | (2006.01) | |
| G02B 5/22 | (2006.01) | |
| G02F 1/167 | (2006.01) | |
| G02B 5/20 | (2006.01) | |
| G02F 1/1335 | (2006.01) | |

(52) U.S. Cl.
CPC *G02B 5/22* (2013.01); *G02B 5/201* (2013.01); *G02F 1/167* (2013.01); *G02F 1/133514* (2013.01); *G02F 2201/52* (2013.01)

(58) Field of Classification Search
USPC .......................................................... 359/296
See application file for complete search history.

(56) References Cited

U.S. PATENT DOCUMENTS

2003/0034950 A1    2/2003  Liang et al.
2006/0284872 A1*  12/2006  Brown et al. ................. 345/426

FOREIGN PATENT DOCUMENTS

| CN | 1159230 | 9/1997 |
|---|---|---|
| EP | 0 786 684 A1 | 7/1997 |
| JP | 5-181006 | 7/1993 |
| JP | 2003-161964 | 6/2003 |
| JP | 2005-500571 | 1/2005 |
| JP | 2005-500572 | 1/2005 |
| JP | 2005-128571 | 5/2005 |
| JP | 2005-346042 | 12/2005 |
| JP | 2006-53497 | 2/2006 |
| JP | 2008-292747 | 12/2008 |

OTHER PUBLICATIONS

Extended European Search Report dated Apr. 28, 2015 in corresponding European Patent Application No. 12836838.8.

(Continued)

*Primary Examiner* — James Jones

(57) ABSTRACT

A color filter used for a display element formed in combination with a display layer that displays white and black, includes only a first subsidiary pixel displaying a first color as a coloring pixel, and a second subsidiary pixel displaying a second color being a complementary color of the first color.

6 Claims, 3 Drawing Sheets

(56) References Cited

OTHER PUBLICATIONS

International Search Report mailed Oct. 16, 2012 in corresponding International Patent Application No. PCT/JP2012/074430.
Korean Office Action dated Feb. 13, 2015 in corresponding Korean Patent Application No. 10-2014-7011212.
PCT International Preliminary Report on Patentability mailed Apr. 10, 2014 in corresponding International Application No. PCT/JP2012/074430.
Chinese Office Action dated Aug. 5, 2015 in corresponding Chinese Patent Application No. 201280047875.6.
Korean Notice of Allowance dated Aug. 25, 2015 in corresponding Korean Patent Application No. 10-2014-7011212.

* cited by examiner

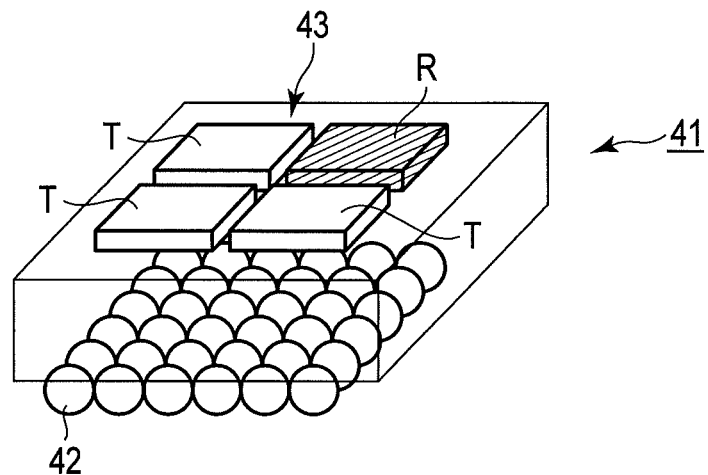
F I G. 4A
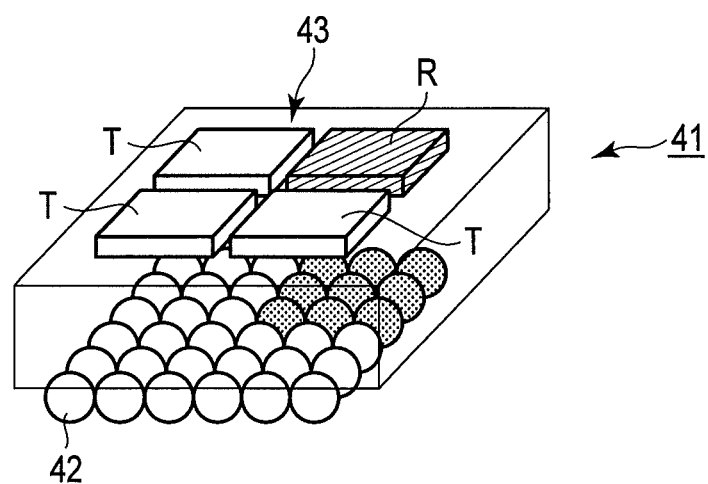
F I G. 4B

COLOR FILTER AND DISPLAY APPARATUS INCLUDING THE SAME

CROSS-REFERENCE TO RELATED APPLICATIONS

This application is a Continuation application of PCT Application No. PCT/JP2012/074430, filed Sep. 24, 2012 and based upon and claiming the benefit of priority from Japanese Patent Application No. 2011-216675, filed Sep. 30, 2011, the entire contents of all of which are incorporated herein by reference.

BACKGROUND OF THE INVENTION

1. Field of the Invention

The present invention relates generally to a color filter, and a display apparatus including the same. In particular, the present invention relates to a color filter for an electrophoretic display apparatus, and an electrophoretic display apparatus including the same.

2. Description of the Related Art

Nowadays, liquid crystal display panels using a backlight are mainly used as image display panels. However, liquid crystal display panels impose a large burden on users' eyes, and are not suitable for uses requiring long-time viewing.

Reflective display panels including an electrophoretic display layer between a pair of electrodes have been proposed as display apparatuses with a small burden on eyes. Electrophoretic display panels display characters and images by reflected light, like printed paper, and thus impose a small burden on users' eyes and are suitable for work that requires long-time viewing of the screen.

Currently, the main display method of electrophoretic display panels is two-color display, that is, black-and-white display, due to the structure thereof. However, multi-color display apparatuses have been proposed. In the multi-color display apparatuses, a color filter formed of three primary colors of red, green, and blue is provided on an electrophoretic display layer to achieve multi-color display (for example, Jpn. Pat. Appln. KOKAI Pub. No. 2003-161964).

On the other hand, multi-color display does not always require full-color display, but there are uses for which three-color display will suffice, that is, white, black, and another color. Using a full-color display apparatus for such use causes problems that the color display becomes dim, and that display of bright white is difficult.

BRIEF SUMMARY OF THE INVENTION

The present invention has been made in consideration of the above circumstances. The object of the present invention is to provide a color filter that is used for a display apparatus and enables bright color display and clear white and black display, and a display apparatus including the color filter.

According to first aspect of embodiments, a color filter is used for a display element formed in combination with a display layer that displays white and black. The color filter includes only a first subsidiary pixel displaying a first color as a coloring pixel, and a second subsidiary pixel displaying a second color being a complementary color of the first color.

The color filter may further include a third transparent subsidiary pixel. Each pixel of the color filter may be formed of the first subsidiary pixel, the second subsidiary pixel, and the third subsidiary pixel.

In this case, the second subsidiary pixel may have an area having a ratio of 0.5 to 2 to an area 1 of the first subsidiary pixel, and the third subsidiary pixel may have an area having a ratio of 0 to 7.5 to the area 1 of the first subsidiary pixel. The first subsidiary pixel may be a red-colored layer, the second subsidiary pixel may be a cyan-colored layer, and the third subsidiary pixel may be a transparent resin layer or a gap.

According to second aspect of embodiments, a display apparatus includes a display layer displaying white and black, with the color filter being formed on the display layer.

The display apparatus may be a reflective display apparatus. The display layer may be an electrophoretic display layer. The electrophoretic display layer may be a microcapsule layer obtained by dispersing microcapsules containing white particles and black particles in a resin.

According to the present invention, provided are a color filter that is used for a three-color display apparatus and enables bright color display and clear white and black display, and a display apparatus including the color filter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 4A is a diagram for explaining color display of a conventional mono-color electrophoretic display panel.

FIG. 4B is a diagram for explaining color display of the conventional mono-color electrophoretic display panel.

DETAILED DESCRIPTION OF THE INVENTION

An embodiment of the present invention will be explained in detail hereinafter.

The number of displayable colors shown in the following embodiment is only an example, and is not limited to the following described matters.

Figure 1:
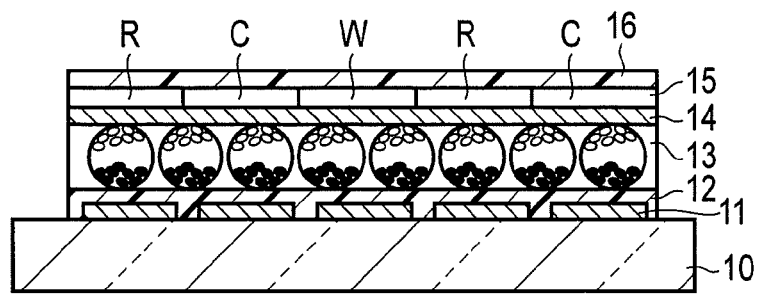
FIG. 1 is a cross-sectional view of an electrophoretic display apparatus including a color filter according to an embodiment of the present invention.

FIG. 1 is a cross-sectional view of an electrophoretic display apparatus including a color filter according to an embodiment of the present invention.

In the electrophoretic display apparatus illustrated in FIG. 1, an electrophoretic display layer 13 is formed on a substrate 10, with an adhesive layer 12 interposed therebetween. Pixel electrodes 11 of a predetermined pattern are formed on a surface of the substrate 10. The pixel electrodes 11 are connected to respective switching elements, and a positive/negative voltage can be applied between the pixel electrodes 11 and a transparent electrode layer 14. The electrophoretic display layer 13 is obtained by fixing microcapsules with a binder resin. The microcapsules are obtained by encapsulating a dispersion medium, in which electrophoretic elements are dispersed in a dispersion.

The transparent electrode layer 14, a color filter 15, and a protective film 16 are successively stacked on the electrophoretic display layer 13. The color filter 15 includes subsidiary pixels of two colors that are complementary colors of each other. For example, a red subsidiary pixel R and a cyan subsidiary pixel C, and a transparent subsidiary pixel T form a pixel. In this case, each subsidiary pixel is provided to correspond to a pattern of the pixel electrodes 11.

The electrophoretic display layer 13 is obtained by fixing microcapsules with a binder resin. The microcapsules are obtained by dispersing two types of particles having different electrical polarities in a transparent dispersion medium, all of which are encapsulated within a microcapsule shell.

Examples of the two types of particles having different electrical polarities are black particles and white particles. Examples of the black particles are an inorganic pigment such as inorganic carbon, fine powder of glass or resin, and a complex thereof. On the other hand, examples of the white particles are a publicly-known white inorganic pigment such as titanium oxide, silica, alumina, and zinc oxide, an organic compound such as polyvinyl acetate emulsion, and a complex thereof.

Although color filters can be formed by photolithography of a colored resist film as performed in color filters for liquid crystal display apparatuses, the color filter 15 used for a electrophoretic display apparatus as in the present embodiment can be formed by forming an accepting layer and applying a plurality of types of inks to the accepting layer. The accepting layer is formed by applying an accepting-layer-forming coating liquid including resin.

Examples of the accepting layer are urethane resin, polyester, acrylic resin, vinyl alcohol resin and the like. The accepting layer can contain a porous material such as synthetic silica and alumina. The accepting layer can be formed by screen printing, offset printing, spin coating, and intermittent coating using a die, in the case of performing single wafer processing. The accepting layer can be formed by a general-purpose application technique, such as die coating, comma coating, curtain coating, gravure coating and the like, in the case of performing roll-to-roll successive processing. The accepting-layer-forming coating liquid after being applied is dried. The method of drying which can be used is, heating, blowing and the like.

Examples of a method of applying ink to the accepting layer of the color filter according to the present embodiment are screen printing, offset printing, inkjet printing and the like, because no black matrix to partition a pixel is formed and thus it is necessary to apply different colors to the accepting layer. In particular, it is preferable to form the color filter by using inkjet printing to eject ink to the accepting layer, since it enables easy alignment and high productivity.

As ink for forming the color filter 15, it is possible to use a publicly-known ink containing a coloring pigment or a coloring dye. As described above, the color filter 15 contains only subsidiary pixels of two colors having a complementary color relationship, as the coloring pixels. The two colors being complementary colors of each other are not limited to red and cyan, but may be a pair of magenta and green, or a pair of yellow and blue. Any pair of two colors may be used, as long as they are complementary colors of each other and can turn into white by mixing.

Subsidiary pixels of each of two colors having a complementary color relationship are not necessarily formed of a colored layer of a single color, but may be formed of a plurality of colored layers having different colors and display a predetermined color by color mixing. For example, the cyan subsidiary pixel C may be formed of a green colored layer and a blue colored layer that display cyan by color mixing.

In the example illustrated in FIG. 1, the color filter 15 is formed of two colors (red subsidiary pixels R and cyan subsidiary pixels C) having a complementary color relationship, and transparent subsidiary pixels T. The color filter 15 may not include transparent subsidiary pixels T, but only include two colors having a complementary-color relationship. The transparent subsidiary pixels T may be formed of transparent resin, or gaps.

In the subsidiary pixels of two colors having a complementary-color relationship, the colored area ratio of each subsidiary pixel is required to be 20% or more, although it is not required to be 100%. This is because the color is not displayed when the colored area ratio of the subsidiary pixel is less than 20%. The colored area ratio of the subsidiary pixel is preferably 30% or more, from the viewpoint of displaying a clear color. The term "colored area ratio" indicates a ratio of an area of the colored part in a subsidiary pixel to the area of the subsidiary pixel, of subsidiary pixels of two colors having a complementary-color relationship.

In the explanation, the term "red" indicates visible light having a wavelength of about 622 to 770 mm, and a complementary color of red is light that absorbs light of the above wavelength range and transmits light of wavelengths other than the above wavelength length, that is, cyan.

Subsidiary pixels in a pixel of the color filter can be arranged in a diagonal manner or in stripes, as illustrated in FIG. 2A and FIG. 2B to FIG. 4A and FIG. 4B. In this case, colored subsidiary pixels are preferably arranged in a diagonal manner, to prevent color mixing.

The number of subsidiary pixels included in a pixel is not specifically limited. A total area of subsidiary pixels colored in a color (hereinafter referred to as "area of subsidiary pixels") may be the same as, or different from, the total area of subsidiary pixels of another color. In the case where subsidiary pixels include three types of red, cyan, and transparent subsidiary pixels, the ratio of the area of the cyan subsidiary pixels to the area 1 of the red subsidiary pixels is preferably 0.5 to 2. When ratio of the area of the cyan subsidiary pixels to the area 1 of the red subsidiary pixels is less than 0.5, a white image displayed tends to become reddish. When the ratio of the area of the cyan subsidiary pixels to the area 1 of the red subsidiary pixels exceeds 2, the brightness of a white image displayed tends to decrease. The ratio of the area of the transparent subsidiary pixels to the area 1 of the red subsidiary pixels is preferably 0 to 7.5, more preferably 1 to 2. When the ratio of the area of the transparent subsidiary pixels to the area 1 of the red subsidiary pixels exceeds 7.5, the color tends to become faint.

Each subsidiary pixel generally has a size having a side of 50 to 200 μm, when it has a rectangular shape.

The following is an explanation of an operating principle of the electrophoretic display apparatus illustrated in FIG. 1.

When a voltage is applied to the pixel electrodes 11, an electric field applied to the microcapsules moves. When the pixel electrode 11 is a positive electrode, negatively-charged particles in each microcapsule move toward the pixel electrode 11, and positively-charged particles therein move toward the transparent electrode layer 14. In the same manner, when the pixel electrode 11 is a negative electrode, positively-charged particles in each microcapsule move toward the pixel electrode 11, and negatively-charged particles therein move toward the transparent electrode layer 14.

For example, supposing that the black particles are positively charged, the white particles are negatively charged, and the pixel electrode 11 is a negative electrode, the black particles move toward the pixel electrode 11, and the white particles move toward the transparent electrode layer 14, as illustrated in FIG. 1. In this case, all of light is reflected by the microcapsule layer on which the white particles exist, and are transmitted through the color filter 15. Since the red subsidiary pixels R are complementary to the cyan subsidiary pixels C, the light that have been transmitted through the pixels turn into white light by mixing with each other, and a bright and clear white image is obtained together with light that has been transmitted through the transparent subsidiary pixels T.

Figure 2A:
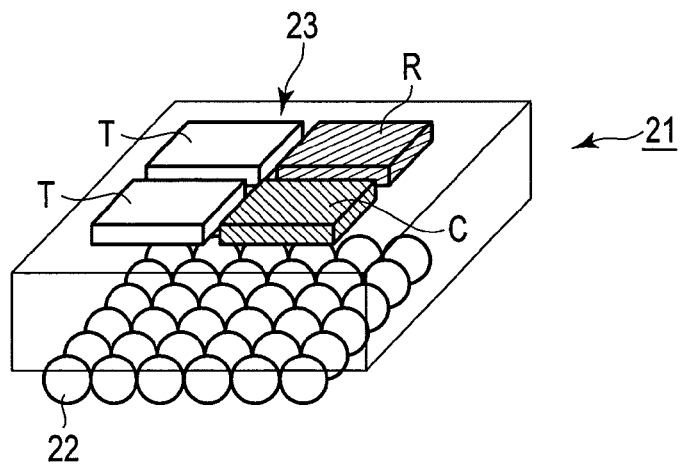
FIG. 2A is a diagram for explaining color display of an electrophoretic display panel according to an embodiment of the present invention.
Figure 2B:
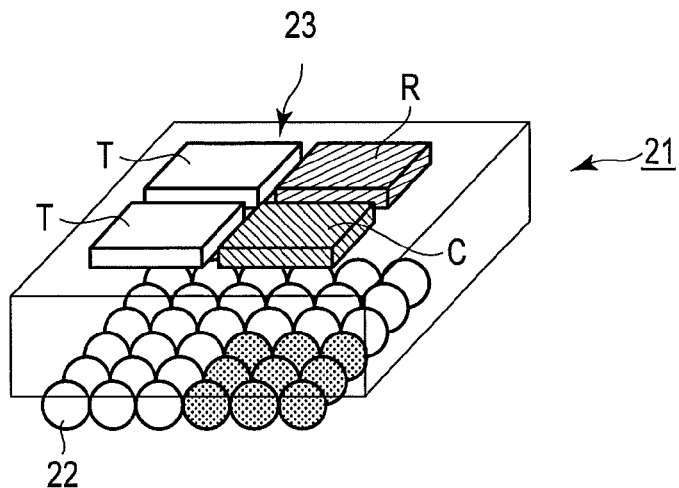
FIG. 2B is a diagram for explaining color display of the electrophoretic display panel according to an embodiment of the present invention.

FIG. 2A and FIG. 2B are diagrams for explaining color display of the electrophoretic display panel based on the above operating principle, according to the embodiment of the present invention. An electrophoretic display panel 21 has a structure in which a color filter 23 including two colors that are complementary to each other, for example, red subsidiary pixels R and cyan subsidiary pixels C, is disposed on a black-and-white electrophoretic display layer 22. The color filter 23 has a structure in which four subsidiary pixels form a pixel, and the other two subsidiary pixels are transparent subsidiary pixels T formed of a transparent resin or the like.

FIG. 2A illustrates the case where all the parts corresponding to a pixel of the electrophoretic display layer 22 are used for white display, FIG. 2B illustrates the case where a part corresponding to the cyan subsidiary pixel among the part corresponding to a pixel of the electrophoretic display layer 22 is used for black display, and the other parts are used for white display.

Specifically, in the case illustrated in FIG. 2A, since all the parts corresponding to a pixel in the electrophoretic display layer 22 are used for white display, all the light that have been transmitted through the color filter 23 are reflected by the electrophoretic display layer 22, and white is displayed by color mixing of the light beam that has been transmitted through the red subsidiary pixel R with the light beam that has been transmitted through the cyan subsidiary pixel C, among the reflect light. In the case illustrated in FIG. 2B, since only the part of the electrophoretic display layer 22 corresponding to the cyan subsidiary pixel C is used for black display, the light that have been transmitted through the color filter 23 are not reflected in the part of the electrophoretic display layer 22 corresponding to the cyan subsidiary pixel C, but reflected in the parts corresponding to the other subsidiary pixels, and red is displayed by light that has been transmitted through the red subsidiary pixel R among the reflected light. When all the parts corresponding to a pixel of the electrophoretic display layer 2 are used for black display, no light is transmitted and observed through the color filter 23, and black is displayed as a matter of course.

According to the structure of the electrophoretic display panel 21 illustrated in FIG. 2a and FIG. 2B, a color is displayed with subsidiary pixels of two colors that are complementary to each other, and the other subsidiary pixels are formed of a transparent resin. Thus, it is possible to display three colors including a bright color (for example, red), clear white, and black.

Figure 3A:
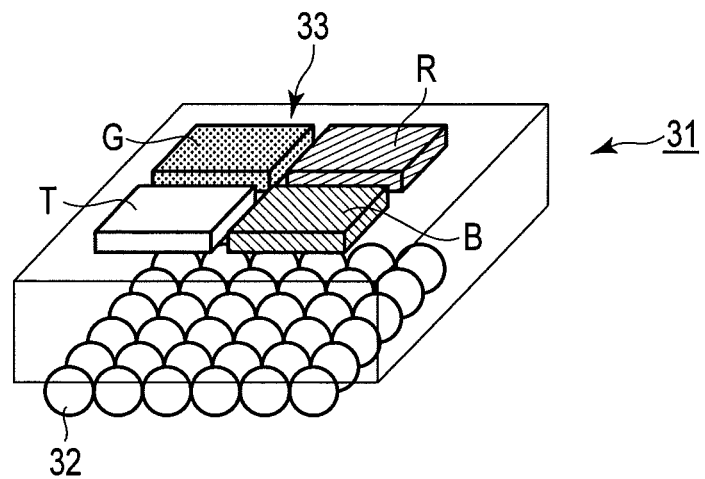
FIG. 3A is a diagram for explaining color display of a conventional full-color electrophoretic display panel.
Figure 3B:
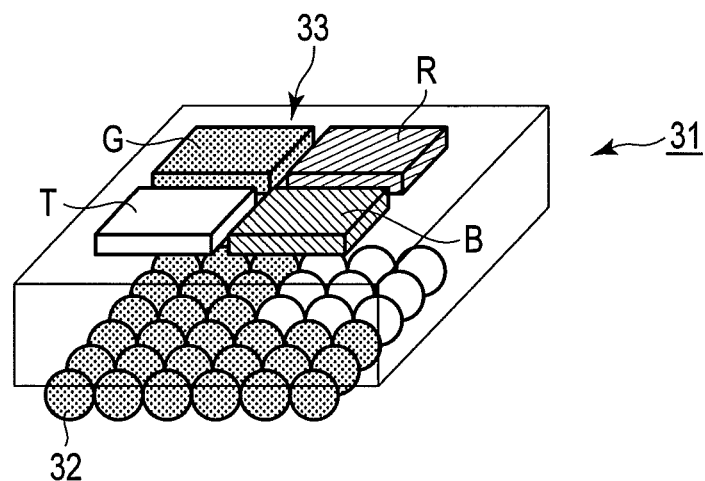
FIG. 3B is a diagram for explaining color display of the conventional full-color electrophoretic display panel.

FIG. 3A and FIG. 3B illustrate a conventional full-color electrophoretic display panel 31 that has a structure in which a color filter 33 including three primary colors, for example, red subsidiary pixels R, green subsidiary pixels G, and blue subsidiary pixels B, is disposed on a black-and-white electrophoretic display layer 32. The color filter 33 has a structure in which four subsidiary pixels form a pixel, and the other one subsidiary pixel is a transparent subsidiary pixel T formed of a transparent resin or a gap.

FIG. 3A illustrates the case where all the parts corresponding to a pixel of the electrophoretic display layer 32 are used for white display, and FIG. 3B illustrates the case where a part corresponding to the red subsidiary pixel R among the part corresponding to a pixel of the electrophoretic display layer 32 is used for white display, and the parts corresponding to the other subsidiary pixels are used for black display.

Specifically, in the case illustrated in FIG. 3A, since all the parts corresponding to a pixel in the electrophoretic display layer 32 are used for white display, all the light that have been transmitted through the color filter 33 are reflected by the electrophoretic display layer 32, and white is displayed by color mixing of the light beam that has been transmitted through the red subsidiary pixel R, the light beam that has been transmitted through the green subsidiary pixel G, and the light beam that has been transmitted through the blue subsidiary pixel B, among the reflect light. In the case illustrated in FIG. 3B, since only the part of the electrophoretic display layer 32 corresponding to the red subsidiary pixel R is used for black display, the light that have been transmitted through the color filter 33 are reflected in the part of the electrophoretic display layer 32 corresponding to the red subsidiary pixel R, and are not reflected in the parts corresponding to the other subsidiary pixels, and red is displayed.

When the electrophoretic display panel 31 illustrated in FIG. 3A and FIG. 3B is compared with the electrophoretic display panel 21 illustrated in FIG. 2A and FIG. 2B, although the electrophoretic display layer 32 has the same structure as that of the electrophoretic display layer 22, the color filter 33 includes three colored subsidiary pixels. Since the color filter 33 includes more subsidiary pixels for obtaining a complementary-color effect and less white subsidiary pixels (transparent resin layer) than those of the color filter 23, the color filter 33 produces a dim colored image, and cannot obtain a bright white image.

FIG. 4A and FIG. 4B illustrate a three-color electrophoretic display panel 41 for comparison, that displays white, black, and another color, like the present invention. The electrophoretic display panel 41 has a structure in which a color filter 33 including a color, for example, red subsidiary pixels R as subsidiary pixels, is disposed on a black-and-white electrophoretic display layer 42. The color filter 43 has a structure in which four subsidiary pixels form a pixel, and the other three subsidiary pixels are transparent subsidiary pixels T formed of a transparent resin or gaps.

FIG. 4A illustrates the case where all the parts corresponding to a pixel of the electrophoretic display layer 42 are used for white display, and FIG. 4B illustrates the case where a part corresponding to the red subsidiary pixel R among the part corresponding to a pixel of the electrophoretic display layer 42 is used for black display, and the parts corresponding to the other three transparent subsidiary pixels T are used for white display.

Specifically, in the case illustrated in FIG. 4A, all the parts corresponding to a pixel in the electrophoretic display layer 43 are used for white display, all the light that have been transmitted through the color filter 43 are reflected by the electrophoretic display layer 42, and red is displayed by the light beam that has been transmitted through the red subsidiary pixel R among the reflect light. In the case illustrated in FIG. 4B, since only the part of the electrophoretic display layer 42 corresponding to the red subsidiary pixel R is used for black display, the light that have been transmitted through the color filter 43 are not reflected in the part of the electrophoretic display layer 42 corresponding to the red subsidiary pixel R, but reflected in the parts corresponding to the other subsidiary pixels, and transmitted through the transparent subsidiary pixels T formed of transparent resin or gaps, and thereby white is displayed.

According to the structure of the electrophoretic display panel 41 illustrated in FIG. 4A and FIG. 4B, when white is displayed in FIG. 4B, white is displayed by light transmitted through only the three transparent subsidiary pixels T. Thus, pink is displayed due to reflection by the surface of the red subsidiary pixel R, although the obtained image is bright. In addition, when white is to be displayed, the part of the electrophoretic display layer corresponding to the red subsidiary pixel R is inevitably used for displaying black. Thus, the red subsidiary pixels R are displayed as black spots, therefore the surface of the display becomes rough.

Examples of the present invention and comparative examples will be explained hereinafter, and the effect of the present invention will be specifically shown.

Example 1

An electrophoretic display apparatus having the structure illustrated in FIG. 1 was prepared.

A dispersion liquid was obtained by dispersing titanium oxide powder (white particles) having an average grain size of 3 μm and each having a surface coated with polyethylene resin and carbon black powder (black particles) having an average grain size of 4 μm and having been subjected to surface treatment with alkyltrimethyl ammonium chloride in tetrachloroethylene. In this case, the white particles were negatively charged, and the black particles were positively charged.

The dispersion liquid was emulsified into an oil-in-water type emulsion, microcapsules were formed by complex-coacervation with gelatin and gum arabic, and thereby the dispersion liquid was encapsulated into microcapsules. The microcapsules obtained as described above were subjected to sieving to make the grain size uniform, such that the microcapsules had an average grain size of 60 μm and the ratio of microcapsules having a grain size of 50 to 70 μm was 50% or more.

Next, an aqueous dispersion liquid of the microcapsules having a 40 mass % solid content was prepared. The aqueous solution was mixed with a urethane-based binder (CP-7050, manufactured by DIC corporation) having a 25 mass % solid content, a surface active agent, a thickener, and pure water, to prepare a coating liquid for forming an electrophoretic layer. The coating liquid was applied to a substrate 10 formed of glass or the like, on which pixel electrodes 11 formed of ITO were formed, and thereby an electrophoretic display layer 13 was formed.

A transparent conductive layer 14 formed of ITO was formed on the electrophoretic display layer 13, and then continuously coated with a polyester-based accepting solution NS-141LX (TAKAMATSU OIL&FAT CO., LTD.) by using a comma coater, to form an accepting layer having an average film thickness of 10 μm.

The accepting layer was subjected to printing with different colors for subsidiary pixels by inkjet printing, and thereby a color filter 15 was formed. Alignment was performed in the printing, and subsidiary pixels were formed in positions corresponding to the pixel electrodes 11. As illustrated in FIG. 2A and FIG. 2B, each pixel of the color filter 15 had a structure in which a rectangular red subsidiary pixel R, a rectangular cyan subsidiary pixel C, and two rectangular transparent subsidiary pixels T are diagonally arranged.

Lastly, a protective film 16 was formed on the color filter 15, and thereby the electrophoretic display apparatus was finished.

The reflectivity and values "a*" and "b*" of the display surface of the electrophoretic display apparatus prepared as described above were measured. The reflectivity was measured by using a spectrocolorimeter as a measuring device, and under the condition of a D65 light source and a 2° parallax. The values "a*" and "b*" were measured by using a spectrocolorimeter as a measuring device, and under the condition of a D65 light source and a 2° parallax.

As a result, the reflectivity in white display was 30.3%, and the reflectivity in red display when only the part of the electrophoretic display layer corresponding to the cyan subsidiary pixel was set to black was 17.2%. Both the reflectivities exhibited high values.

The value "a*" in white display was −4.1, the value "b*" was −1.1, and thus clear white display was obtained.

Example 2

An electrophoretic display apparatus was finished in the same manner as Example 1, except that each pixel in Example 1 was made by diagonally arranging a rectangular blue subsidiary pixel, a rectangular yellow subsidiary pixel, and two rectangular transparent subsidiary pixels.

The reflectivity and values "a*" and "b*" of the display surface of the electrophoretic display apparatus prepared as described above were measured in the same manner as Example 1.

As a result, the reflectivity in white display was 30.1%, and the reflectivity in blue display when only the part of the electrophoretic display layer corresponding to the yellow subsidiary pixel was set to black was 16.1%. Both the reflectivities exhibited high values.

The value "a*" in white display was −4.3, the value "b*" was −1.2, and thus clear white display was obtained.

Example 3

An electrophoretic display apparatus was finished in the same manner as Example 1, except that each pixel in Example 1 was made by diagonally arranging a rectangular green subsidiary pixel, a rectangular magenta subsidiary pixel, and two rectangular transparent subsidiary pixels.

The reflectivity and values "a*" and "b*" of the display surface of the electrophoretic display apparatus prepared as described above were measured in the same manner as Example 1.

As a result, the reflectivity in white display was 31.5%, and the reflectivity in green display when only the part of the electrophoretic display layer corresponding to the magenta subsidiary pixel was set to black was 18.2%. Both the reflectivities exhibited high value.

The value "a*" in white display was −4.4, the value "b*" was −1.0, and thus clear white display was obtained.

Comparative Example 1

An electrophoretic display apparatus was finished in the same manner as the Examples, except that the color filter for full-color display apparatuses illustrated in FIG. 3A and FIG. 3B, each pixel of which is formed of a red subsidiary pixel R, a green subsidiary pixel G, a blue subsidiary pixel B, and a transparent subsidiary pixel T, was used as the color filter.

The reflectivity and values "a*" and "b*" of the display surface of the electrophoretic display apparatus were measured in the same manner as the Examples. As a result, the reflectivity in white display was 15.4%, the reflectivity in red display was 4.7%, the reflectivity in blue display was 4.6%, and the reflectivity in green display was 5.8%. Each of the reflectivities exhibited low values, in comparison with Examples 1 to 3.

The value "a*" in white display was −4.2, and the value "b*" was −1.1.

Comparative Example 2

An electrophoretic display apparatus was finished in the same manner as the Examples, except that the color filter for mono-color display apparatuses illustrated in FIG. 4A and FIG. 4B, each pixel of which is formed of a red subsidiary pixel R and three transparent subsidiary pixels T, was used as the color filter.

The reflectivity and values "a*" and "b*" of the display surface of the electrophoretic display apparatus were measured in the same manner as the Examples. As a result, although the reflectivity in white display had a high value of 25.5%, the value "a*" was 1.5, and the value "b*" was 1.9, both of which were higher than the values in Example 1, and white display was reddish. In addition, the part of the electrophoretic layer corresponding to the red subsidiary pixels R was used for black display, and thereby the surface of the display became rough.

As described above, the electrophoretic display apparatuses according to Examples 1 to 3 had higher reflectivities in all the cases of white display, red display, blue display, and green display than the reflectivity of the full-color electrophoretic display apparatus according to Comparative Example 1, and exhibited clearer white display than the mono-color electrophoretic display apparatus according to Comparative Example 2, by virtue of their values a* and b* in white display. In addition, the electrophoretic display apparatuses according to Examples 1 to 3 had no roughness on the surface of the display image, which was found in white display in the mono-color electrophoretic display apparatus according to Comparative Example 2.

The present invention is not limited to the electrophoretic display apparatuses explained above as the display apparatus, but is applicable to various display apparatuses. Specifically, the present invention is not limited to reflective display apparatuses, but is applicable to transmissive display apparatuses. An example of a transmissive display apparatus is a liquid crystal display apparatus, and examples of reflective display apparatuses are a liquid crystal display apparatus and electronic paper. Examples of the electronic paper are electrophoretic display apparatuses, twist ball type display apparatuses, and powder moving display apparatuses. Examples of electrophoretic display apparatuses are microcapsule display apparatuses, and microcup display apparatuses.

Among the above, applying the present invention to a microcapsule display apparatus produces advantages that particularly bright white display is obtained and power consumption is small.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A color filter for use in a reflective display apparatus, comprising:
    a transparent accepting layer stacked on a display layer on which pixels defining four display areas are arranged, each of the four display areas being configured to display black or white; and
    a colored layer coated on that surface of the accepting layer which is opposite to a surface on which the display layer is provided, the colored layer comprising a pixel including:
        a first colored layer opposed to a first display area, which is one of the four display areas defined by the pixels of the display layer,
        a second colored layer opposed to a second display area different from the first display area and showing a complementary color to that of the first display area, and
        two transparent layers opposed to two third display areas which are different from the first display area and the second display area.

2. The color filter according to claim 1, wherein the first colored layer is a red-colored layer, the second colored layer is a cyan-colored layer, and the transparent layers are transparent resin layers or gaps.

3. A reflective display apparatus capable of displaying at least three colors, comprising:
    a display layer on which pixels defining four display areas are arranged, each of the four display areas being configured to display black or white;
    a color filter comprising
        a transparent accepting layer stacked on the display layer, and
        a colored layer coated on that surface of the accepting layer which is opposite to a surface on which the display layer is provided, the colored layer comprising a pixel including
            a first colored layer opposed to a first display area, which is one of the four display areas defined by the pixels of the display layer,
            a second colored layer opposed to a second display area different from the first display area and showing a complementary color to that of the first display area, and
            two transparent layers opposed to two third display areas which are different from the first display area and the second display area;
    a transparent electrode layer interposed between the display layer and the accepting layer; and
    a protective film stacked on the color filter and preventing ink from peeling off the first and second colored layers.

4. The display apparatus according to claim 3, wherein the display layer is an electrophoretic display layer including a microcapsule.

5. The display apparatus according to claim 4, wherein the electrophoretic display layer is a microcapsule layer obtained by dispersing microcapsules containing white particles and black particles in a resin.

6. A method for manufacturing a reflective display apparatus comprising a color filter, the method comprising:
    forming a display layer on which pixels defining four display areas are arranged, the display layer being formed on a substrate provided with pixel electrodes, each of the four display areas being configured to display black or white;
    forming a transparent electrode layer on the display layer;
    stacking a transparent accepting layer on the transparent electrode layer;
    forming a colored layer, using alignment marks on the substrate as a reference, such that the color layer is formed on that surface of the accepting layer which is opposite to a surface on which the display layer is provided, the colored layer comprising a pixel including
a first colored layer opposed to a first display area, which is one of the four display areas defined by the pixels of the display layer,
a second colored layer opposed to a second display area different from the first display area and showing a complementary color to that of the first display area, and
two transparent layers opposed to two third display areas which are different from the first display area and the second display area; and forming a protective film on the colored layer.

\* \* \* \* \*